B. F. SWEENEY.
WEED PULLER.
APPLICATION FILED AUG. 5, 1910.

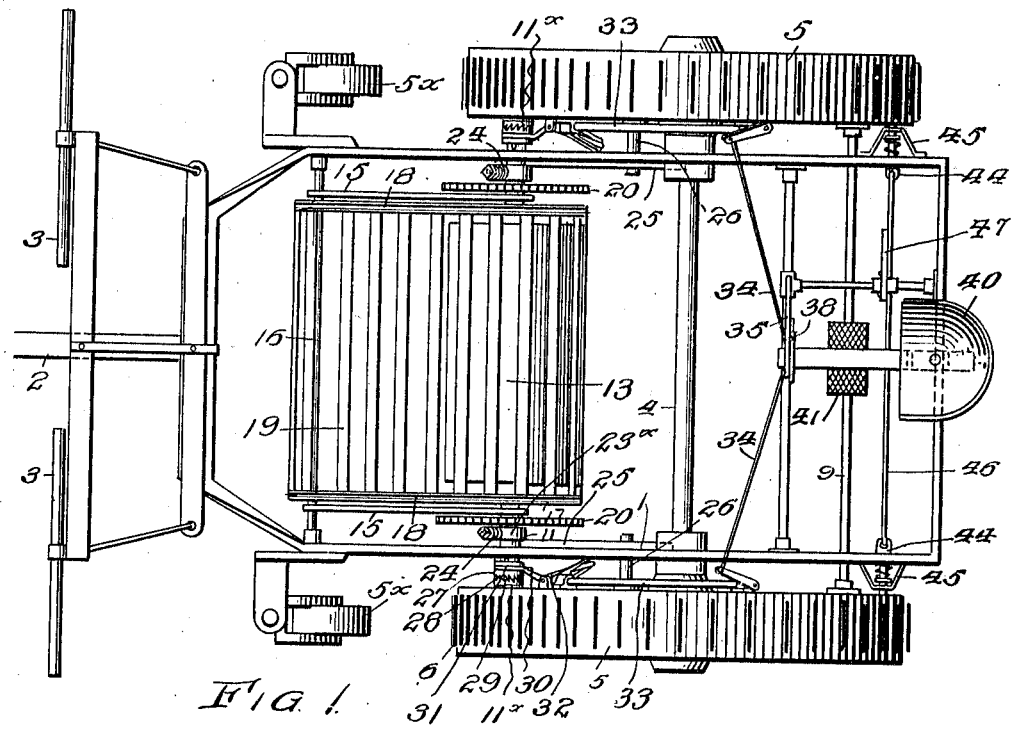

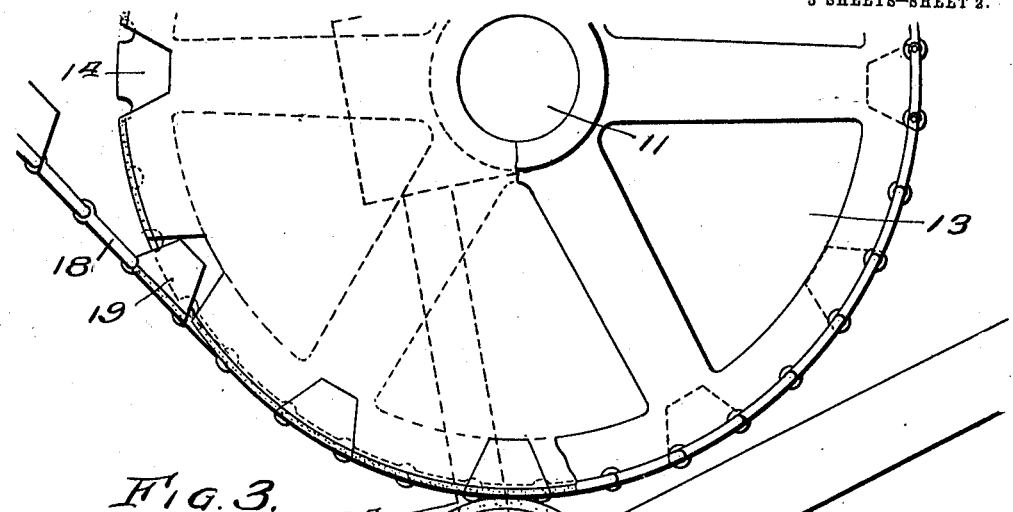
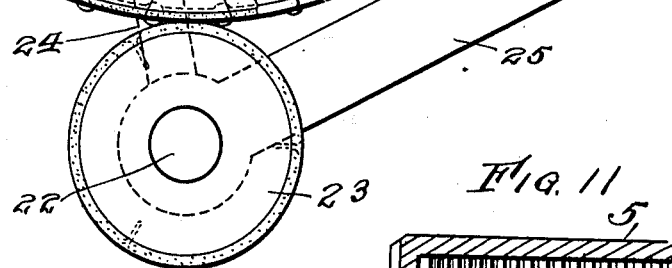
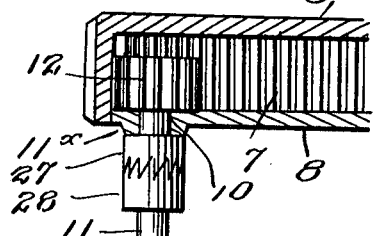
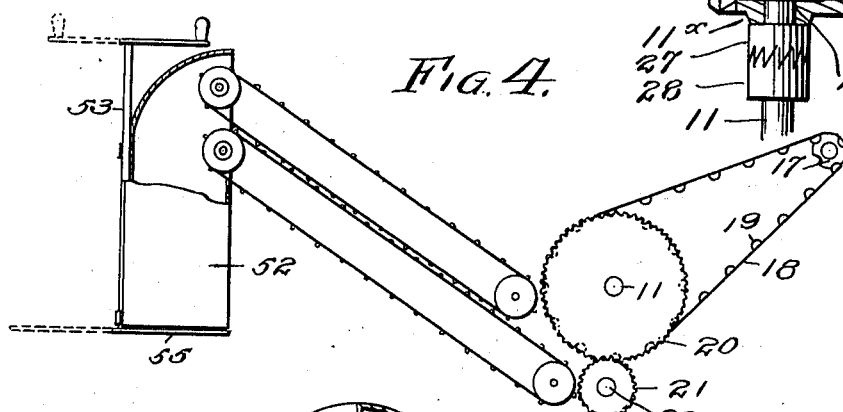
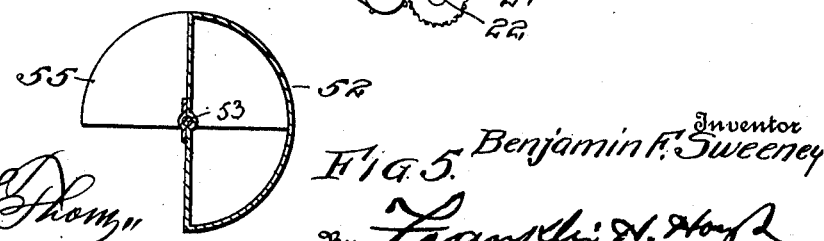

988,405.

Patented Apr. 4, 1911.
3 SHEETS—SHEET 3.

Witnesses

Inventor
Benjamin F. Sweeney
By
Attorney

UNITED STATES PATENT OFFICE.

BENJAMIN FRANKLIN SWEENEY, OF NEOSHO, MISSOURI.

WEED-PULLER.

988,405.

Specification of Letters Patent. Patented Apr. 4, 1911.

Application filed August 5, 1910. Serial No. 575,652.

*To all whom it may concern:*

Be it known that I, BENJAMIN F. SWEENEY, a citizen of the United States, residing at Neosho, in the county of Newton and State of Missouri, have invented certain new and useful Improvements in Weed-Pullers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for pulling weeds, briers, etc., and comprises a simple and efficient apparatus for this purpose having various details of construction, combinations and arrangements of parts which will be hereinafter fully described and then specifically defined in the appended claims.

I illustrate my invention in the accompanying drawings, in which:—

Figure 8:
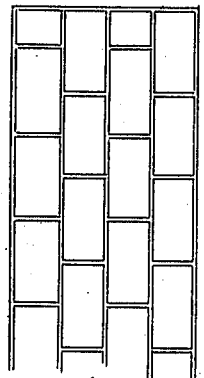
Figure 9:
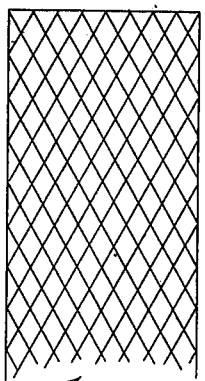
Figure 10:
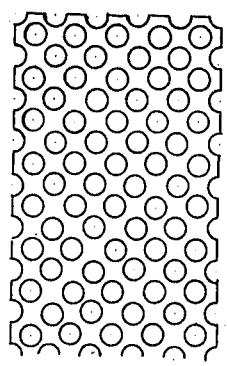
Figure 6:
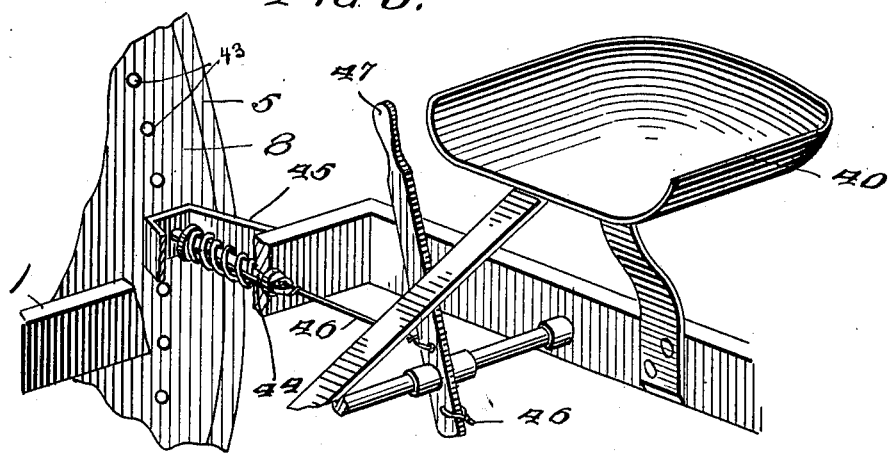
Figure 7:
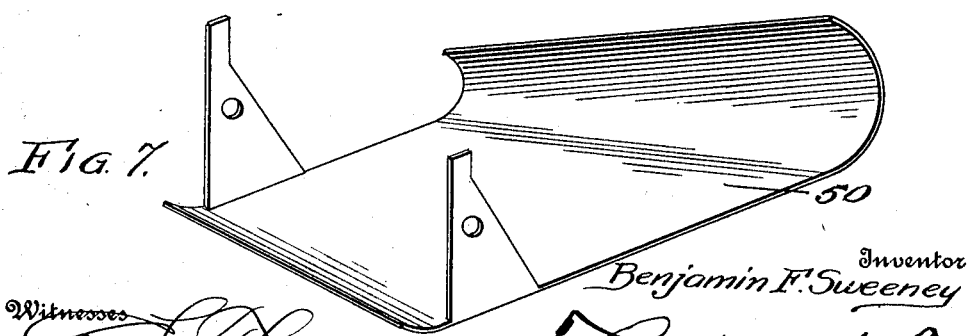

Figure 1 is a top plan view of my weed pulling machine. Fig. 2 is a sectional view showing parts in elevation. Fig. 3 is an enlarged detail in elevation showing the means for gripping and pulling the weeds. Fig. 4 is a detail view in elevation showing a slight modification of the apparatus. Fig. 5 is a detail view of the pivotal bottom of the weed receptacle. Fig. 6 is an enlarged detail view showing the means for adjusting the rollers. Fig. 7 is a modified form of an attachment. Figs. 8, 9 10 show modified forms of paddings covering the rollers, and Fig. 11 is a detail plan view showing relative arrangements of parts of the apparatus.

Reference now being had to the details of the drawings by numerals, 1 designates a frame of any suitable size or shape to which a tongue 2 is fastened, having the whiffletrees 3 to which horses may be connected. Mounted in said frame is an axle 4 upon which the driving wheels 5 are journaled, said wheels having series of ribs or spurs 6 about their circumferences to prevent the wheels slipping. Caster wheels 5× are also mounted adjacent to the forward end of the frame and the inner marginal periphery of the rim of each wheel 5 is provided with gear teeth 7, and 8 designates a disk or shield which is provided for the purpose of preventing dirt or other foreign matter from coming into contact with the gear teeth 7 and has connected thereto braces 9. The shield is recessed in its edge as at 10 for the reception of one end of the shaft 11 having a gear wheel 12 journaled thereon which is in mesh with the gear teeth 7. Said shaft 11 is journaled in the bracket members 11× and has fixed thereto a roller 13 provided with series of longitudinal recesses 14 formed therein at intervals, the opposite walls of which recesses are inclined.

Hangers, designated by numeral 15, are journaled upon the cross rod 16 which is mounted in the frame 1 and sprocket chains 18 having bars 19 fixed thereto pass about said roller 13 and sprocket wheel 17 upon the cross rod 16. Opposite longitudinal edges of said bars 19 are inclined to correspond with the inclination of the side walls of the recesses in the roller 13 in which they seat as the roller and chain turn.

A gear wheel 20 is fixed to the shaft 11 and meshes with a pinion 21, which is fixed to a shaft 22 upon which a roller 23 is mounted. Said shaft 23 is journaled in eyes 23× formed at the ends of the spring hangers 24 which latter are adapted to be held in different adjusted positions. A bracket member 25 is fastened to a post 26 upon shield 8 and serves also to support the shaft 22 which yields under the tension of the spring mounted upon the hanger 24.

Splined to the shaft 11 is a collar 27 having teeth 28 upon one edge thereof adapted to intermesh with the teeth 29 upon the face of the gear wheel 12 when it is desired to throw the shaft 11 into or out of gear. A swiveled ring 30 is mounted in grooves formed in the circumference of the collar 27 and a forked member 31 engages said ring pivotally mounted upon the pin 32 and has connection with a rock shaft 33 which in turn is connected by the rods 34 to the operating lever 35 pivotally mounted upon the frame of the apparatus. A spring-pressed pawl 37 is adapted to engage the teeth of the segment 38 and is actuated by a lever 39. It will be noted upon reference to the top plan view that there are two of said rods 34, each connected with the operating lever and each adapted to throw a clutch collar 27 upon one side of the frame. A suitable seat 40 is mounted upon the frame and adjacent to the platform 41.

It will be noted upon reference to the drawings that the shield is provided with a series of perforations 43 which are adapted to be engaged by spring-pressed pins 44 mounted in the bracket members 45 upon the frame, said pins adapted to register with one or another of the perforations 43 to hold the disk in different adjusted positions accordingly as it may be desired to hold the rollers at different elevations, and bars 46 are connected one to each pin 44 and its other end to an operating lever 47 pivotally mounted upon the frame within convenient reach of the seat.

A weed turning fender 50 is mounted upon the hanger supporting the roller 23 and is adapted to turn the weeds off from the machine after they have passed between the rollers. The two rollers 13 and 23 are preferably covered with a soft padding of leather or other suitable material and said covering has preferably a checkered surface as shown in the detail view of the drawings or may have other configurations thereon, the purpose of forming a covering in this manner being to protect the weed from being broken so that the same may be gripped and held while the weed is being pulled.

In Fig. 4 of the drawings, I have shown a slight modification of an attachment to the device in which a box 52 is fastened to the frame of the weed puller and provided for the purpose of receiving beans, peas, etc., when the apparatus is adapted for use for this purpose and a vertically mounted shaft 53 is journaled in said box and has a bottom 55 fastened thereto and designed to swing as the shaft is turned to allow the contents of the box to be dumped.

In operation, as the apparatus is driven over the ground and a rotary movement imparted to the rollers, the weeds are caught between the bars 19 upon the sprocket chains and guided between the two rollers 13 and 23 where they are frictionally gripped, the bars 19 seating in the recesses to form a portion of the upper roller 13 while it is exerting its pulling effect upon the weeds, the space upon the roller 13 intermediate the projections 19 serving to still hold and exert a pulling force upon the weed until its root has been withdrawn from the ground, after which the weeds, after passing between the rollers, drop into the fender and are deposited at one side of the apparatus. By the manipulation of the operating lever, the clutch collars may be thrown into or out of gear to stop the machine when desired and, by adjusting the pins 44 in one or another of the perforations 43, the rollers may be adjusted to be operated at different elevations.

While I have illustrated the principle of my invention as being mounted upon a frame designed to be drawn by horses, it will be understood that the apparatus may be driven by any suitable motive power, the gist of the invention comprising the particular form of mechanical apparatus for directing the weeds to any location where they are gripped between the projections upon the sprocket chains and the lower roller, said projections forming a part of the cylinder while the weed is being extracted from the ground.

What I claim to be new is:—

1. An apparatus for pulling weeds, comprising a frame, driving wheels, a roller mounted in said frame and provided with series of recesses, sprocket wheels rotatably mounted upon the frame, sprocket chains passing about said sprocket wheels and roller, bars fastened to said sprocket chains and adapted to seat in said recesses of the roller as the latter rotates, means for driving the roller, and a second roller coöperating with the recessed roller and said bars to grip and pull a weed from the ground.

2. An apparatus for pulling weeds, comprising a frame, driving wheels, an adjustable roller mounted in said frame and provided with series of recesses, sprocket wheels rotatably mounted upon the frame, sprocket chains passing about said sprocket wheels and roller, bars fastened to said sprocket chains and adapted to seat in said recesses of the roller as the latter rotates, means for driving the roller, and a second roller coöperating with the recessed roller and said bars to grip and pull a weed from the ground.

3. An apparatus for pulling weeds, comprising a frame, driving wheels, an adjustable roller mounted in said frame and provided with series of recesses, sprocket wheels rotatably mounted upon the frame, sprocket chains passing about said sprocket wheels and roller, bars fastened to said sprocket chains and adapted to seat in said recesses of the roller as the latter rotates, means for driving the roller, and a second and adjustable roller coöperating with the recessed roller and said bars to grip and pull a weed from the ground.

4. An apparatus for pulling weeds, comprising a frame, driving wheels, an adjustable roller mounted in said frame and provided with series of recesses, sprocket wheels rotatably mounted upon the frame, sprocket chains passing about said sprocket wheels and roller, bars fastened to said sprocket chains and adapted to seat in said recesses of the roller as the latter rotates, means for driving the roller, a second and adjustable roller coöperating with the recessed roller and said bars to grip and pull a weed from the ground, and means for holding the rollers in adjusted positions.

5. An apparatus for pulling weeds, comprising a frame, driving wheels, an adjustable roller mounted in said frame and provided with a series of recesses, sprocket wheels rotatably mounted upon the frame, sprocket chains passing about said sprocket wheels and rollers, bars fastened to said sprocket chains and adapted to seat in said recesses of the roller as the latter rotates, means for driving the roller, a second and adjustable roller coöperating with the recessed roller and said bars to grip and pull a weed from the ground, padded coverings upon said rollers, and means for holding the latter in adjusted positions.

6. An apparatus for pulling weeds comprising a frame, an axle thereon, driving wheels having each a series of gear teeth, a shield adjacent to each wheel and provided with a recess, bracket members fastened to said shields, a shaft mounted in said bracket members and extending through the recess of the shield, a gear wheel journaled upon said shaft and in mesh with the teeth of said gear wheels having ratchet teeth upon the face thereof, and clutch collars splined to said shaft, means for throwing the same into and out of mesh with the ratchet teeth upon the face of said gear wheel, a roller fixed to said shaft and provided with a series of recesses, sprocket wheels journaled upon the frame, sprocket chains passing about said sprocket wheels and roller, bars connecting said chains and adapted to successively seat in said recesses of the roller as the latter turns, a second roller, and gear connections between the rollers.

7. An apparatus for pulling weeds comprising a frame, an axle thereon, driving wheels having each a series of gear teeth, a shield adjacent to each wheel and provided with a recess, bracket members fastened to said shields, a shaft mounted in said bracket members and extending through the recesses of the shields, a gear wheel journaled upon said shaft and in mesh with the teeth of said driving wheels, clutch collars splined to said shaft, a pivotal forked lever engaging said clutch collar, a pivotal operating lever and connections between the same and said forked lever, a roller fixed to said shaft and provided with a series of recesses, sprocket wheels journaled upon the frame, sprocket chains passing about said sprocket wheels and roller, bars connecting said chains and adapted to successively seat in said recesses of the roller as the latter turns, a second roller, and gear connections between the rollers.

8. An apparatus for pulling weeds comprising a frame, an axle thereon, driving wheels having each a series of gear teeth, a shield adjacent to each wheel and provided with a recess, bracket members fastened to said shields, a shaft mounted in said bracket members and extending through the recesses of the shields, a gear wheel journaled upon said shaft and in mesh with the teeth of said driving wheels, clutch collars splined to said shaft, a pivotal forked lever engaging said clutch collars, a pivotal operating lever and connections between the same and said forked lever, a roller fixed to said shaft and provided with a series of recesses, sprocket wheels journaled upon the frame, sprocket chains passing about said sprocket wheels and roller, bars connecting said chains and adapted to successively seat in said recesses of the roller as the latter turns, a second roller, gear connections between the rollers, said shield having a series of perforations, an operating lever, and pins actuated thereby and adapted to engage the perforations of the shield to hold the same and said rollers in different adjusted positions.

9. An apparatus for pulling weeds comprising a frame, an axle thereon, driving wheels having each a series of gear teeth, a shield adjacent to each wheel and provided with a recess, bracket members fastened to said shields, a shaft mounted in said bracket members and extending through the recesses of the shields, a gear wheel journaled upon said shaft and in mesh with the teeth of said driving wheels, clutch collars splined to said shaft, a pivotal forked lever engaging said clutch collars, a pivotal operating lever and connections between the same and said forked lever, a roller fixed to said shaft and provided with a series of recesses, sprocket wheels journaled upon the frame, sprocket chains passing about said sprocket wheels and roller, bars connecting said chains and adapted to successively seat in said recesses of the roller as the latter turns, a second roller, gear connections between the rollers, said shield having a series of perforations, spring-pressed pins mounted upon the frame and adapted to engage the perforations in the shield to hold the latter in different adjusted positions, and an operating lever connected to said pins.

10. An apparatus for pulling weeds comprising a frame, an axle, driving wheels mounted thereon, each having an internal series of gear teeth, a shield adjacent to each driving wheel, bracket members secured to each shield, a shaft journaled in said bracket members, a roller having a series of longitudinal recesses formed in the circumference, a cross rod mounted upon the frame, sprocket wheels upon said rod, sprocket chain connections between the sprocket wheels and roller, bars fastened to said chain and adapted to seat in said recesses of the roller as the latter rotates, hangers journaled upon said rod and in which said shaft has bearings, a second roller, gear connections between the rollers, and means for holding the rollers in different adjusted positions.

11. An apparatus for pulling weeds comprising a frame, an axle, driving wheels mounted thereon, each having an internal series of gear teeth, a shield adjacent to each driving wheel, bracket members secured to each shield, a shaft journaled in said bracket members, a roller having a series of longitudinal recesses formed in the circumference, a cross rod mounted upon the frame, sprocket wheels upon said rod, sprocket chain connections between the sprocket wheels and roller, bars fastened to said chain and adapted to seat in said recesses of the roller as the latter rotates, hangers journaled upon said rod and in which said shaft has bearings, a second roller and a yielding hanger therefor, and means for holding the rollers in different adjusted positions.

In testimony whereof I hereunto affix my signature in the presence of two witnesses.

BENJAMIN FRANKLIN SWEENEY.

Witnesses:
BERT BOX,
FRANK BOYD.

---

Copies of this patent may be obtained for five cents each, by addressing the "Commissioner of Patents, Washington, D. C."